US010091214B2

(12) United States Patent
Godlewski et al.

(10) Patent No.: US 10,091,214 B2
(45) Date of Patent: Oct. 2, 2018

(54) MALWARE WARNING

(71) Applicant: Finjan Mobile, Inc., East Palo Alto, CA (US)

(72) Inventors: Michael Godlewski, San Francisco, CA (US); Geoffrey House, San Francisco, CA (US); Winnie Tong, San Francisco, CA (US); Rudolph Mutter, Millbrae, CA (US); Bay Lee Feore, San Francisco, CA (US); Timothy Shipman, San Francisco, CA (US); Anthony Scherba, San Francisco, CA (US); Lee McDole, Oakland, CA (US); Alexander Lin Kremer, San Mateo, CA (US); Julie Mar-Spinola, San Jose, CA (US)

(73) Assignee: Finjan Mobile, Inc., East Palo Alto, CA (US)

( * ) Notice: Subject to any disclaimer, the term of this patent is extended or adjusted under 35 U.S.C. 154(b) by 232 days.

(21) Appl. No.: 15/069,981

(22) Filed: Mar. 15, 2016

(65) Prior Publication Data
US 2016/0337379 A1    Nov. 17, 2016

Related U.S. Application Data

(60) Provisional application No. 62/159,862, filed on May 11, 2015.

(51) Int. Cl.
*G06F 21/55* (2013.01)
*H04L 29/06* (2006.01)
(Continued)

(52) U.S. Cl.
CPC .............. *H04L 63/14* (2013.01); *G06F 3/048* (2013.01); *G06F 21/554* (2013.01); *H04L 63/1441* (2013.01); *H04L 67/02* (2013.01)

(58) Field of Classification Search
CPC .............................. H04L 63/14; G06F 21/554
See application file for complete search history.

(56) References Cited

U.S. PATENT DOCUMENTS 8,584,240 B1    11/2013  Yang et al.
8,869,271 B2    10/2014  Jayaraman et al.
(Continued)

OTHER PUBLICATIONS

"URL Access Warning Notifications", 2011, retrieved online <https://docs.trendmicro.com/all/ent/iwsva/v5.5/en-us/iwsva_5.5_olh/notifications_url_warning.htm>, retrieved on Dec. 18, 2017.*
(Continued)

*Primary Examiner* — Farid Homayounmehr
*Assistant Examiner* — Zhimei Zhu
(74) *Attorney, Agent, or Firm* — Soquel Group I.P. Ltd.

(57) ABSTRACT

A malware warning system, including a client sending requests to and receiving replies from a server, and a server, including a first warning generator sending to the client a warning including a threat level of content located at a web site, in response to receiving from the client a URL for accessing content at the web site, a second warning generator sending to the client a warning including information about at least one of the nature of the threat of the content located at the web site and a location of the web site, in response to receiving from the client a request for more information about the nature of the threat, and a third warning generator, sending to the client a warning including an instruction to perform a swipe gesture to confirm a request to access the URL, in response to receiving that request from the client.

18 Claims, 16 Drawing Sheets

(51) Int. Cl.
*G06F 3/048* (2013.01)
*H04L 29/08* (2006.01)

(56) References Cited

U.S. PATENT DOCUMENTS

| | | | |
|---|---|---|---|
| 8,904,495 B2* | 12/2014 | Baghdasaryan | G06Q 20/10 |
| | | | 705/75 |
| 9,100,426 B1 | 8/2015 | Fang | |
| 2006/0236392 A1* | 10/2006 | Thomas | G06F 21/562 |
| | | | 726/23 |
| 2009/0287705 A1* | 11/2009 | Schneider | G06F 17/30864 |
| 2011/0191849 A1* | 8/2011 | Jayaraman | H04L 63/1416 |
| | | | 726/23 |
| 2012/0047461 A1* | 2/2012 | Colvin | G06F 21/50 |
| | | | 715/810 |
| 2015/0067853 A1 | 3/2015 | Amrutkar et al. | |
| 2015/0281262 A1* | 10/2015 | Cai | H04L 63/1408 |
| | | | 726/23 |

OTHER PUBLICATIONS

PCT/US2016/026856, International Search Report and Writen Opinion, dated Jul. 11, 2016 11 pages.

* cited by examiner

MALWARE WARNING

PRIORITY REFERENCE TO PROVISIONAL APPLICATIONS

This application claims benefit of and hereby incorporates by reference U.S. Provisional Application No. 62/159,862, entitled SECURE BROWSER APPLICATION, and filed on May 11, 2015 by inventors Mike Godlewski, Geoff House, Winnie Tong, Rudolph Mutter, Baylee Feore, Timothy Shipman, Tony Scherba and Julie Mar-Spinola.

FIELD OF THE INVENTION

The present invention relates to computer security and in particular to warning a user about malware to prevent virus attacks on computing devices.

BACKGROUND OF THE INVENTION

Users are adept today at touch-based input for many kinds of computing devices, and are able to perform tasks such as touch-keystrokes at a rapid-fire rate, even with small touch areas. This makes it difficult for users to make an abrupt stop when a malware application is encountered, and prevent its activation. Even though a user has installed an anti-virus application, and a malware warning message appears, the user may react "one touch too late", after the malware has been launched.

The damage caused by malware may be enormous. Malware can wipe out a smartphone or tablet computer, and/or extract sensitive data enabling a hacker to cause financial or other harm.

Sometimes an anti-virus application flags an unrecognized web site, application or file as being suspicious, when a user knows that the application or file is safe, a condition referred to as a "false positive". In such case, the user intentionally ignores a malware warning message.

Thus what is needed to prevent a user from unintentionally ignoring a malware warning message is a new type of malware warning mechanism.

SUMMARY

Embodiments of the present invention provide multiple warning modules, systems and methods that generate important information about specific malware that a user is encountering, and that require a confirmatory action from the user that is different than a simple touch prior to accessing a suspicious web site, application or file, thus preventing the "one touch too late" catastrophe.

There is thus provided in accordance with an embodiment of the present invention a non-transitory computer readable medium storing instructions, which, when executed by a processor of an electronic device, cause the processor to (i) receive an identifier for accessing content at a destination web site, (ii) in response to receiving the identifier, generate a warning comprising a threat level of content located at the destination web site, (iii) receive a request for more information about the nature of the threat, (iv) in response to receiving the request for more information, generate a warning comprising information about at least one of (i) the nature of the threat of the content, and (ii) a location of the destination web site, (v) receive a request to access the content, and (vi) in response to receiving the request to access the content, generating a warning comprising an instruction to perform a confirmatory touch gesture to confirm the request to access the content.

There is additionally provided in accordance with an embodiment of the present invention a malware warning module for an electronic device, including one or more touch-enabled input devices, receiving user input, a first warning generator, generating a warning comprising a threat level of content located at a destination web site, in response to the one or more input devices receiving an identifier for accessing content at the destination web site, a second warning generator, generating a warning including information about at least one of (i) the nature of the threat of the content, and (ii) a location of the destination web site, in response to the one or more input devices receiving a request for more information about the nature of the threat; and a third warning generator, generating a warning including an instruction to perform a confirmatory touch gesture to confirm a request to access the content, in response to the one or more input devices receiving a request to access the content.

There is further provided in accordance with an embodiment of the present invention a malware warning system, including a touch-enabled client computer device sending requests to and receiving replies from a server computing device, and a server computing device receiving the requests from the client, including a first warning generator, sending to the client a warning including a threat level of content located at a destination web site, in response to receiving from the client an identifier for accessing content at the destination web site, a second warning generator, sending to the client a warning comprising information about at least one of (i) the nature of the threat of the content, and (ii) a location of the destination web site, in response to receiving from the client a request for more information about the nature of the threat, and a third warning generator, sending to the client a warning including an instruction to perform a swipe gesture to confirm a request to access the content, in response to receiving from the client a request to access the content.

There is yet further provided in accordance with an embodiment of the present invention a non-transitory computer readable medium storing instructions, which, when executed by a processor of an electronic device, cause the processor to (i) receive an identifier for accessing content at a destination web site, (ii) in response to receiving the identifier, generate a warning comprising a threat level of content located, (iii) receive a request to access the content, and (iv) in response to receiving the request to access the content, generate a warning including an instruction to perform a confirmatory touch gesture to confirm the request to access the content.

There is moreover provided in accordance with an embodiment of the present invention a malware warning module for an electronic device, including one or more touch-enabled input devices receiving user input, a first warning generator, generating a warning including a threat level of content located at a destination web site, in response to the one or more input devices receiving an identifier for accessing content at the destination web site, and a second warning generator, generating a warning including an instruction to perform a confirmatory touch gesture to confirm a request to access the content, in response to the one or more input devices receiving a request to access the content.

There is additionally provided in accordance with an embodiment of the present invention a malware warning system, including a touch-enabled client computer device sending requests to and receiving replies from a server computing device, and a server computing device receiving the requests from the client computer device, including a first warning generator, sending to the client a warning including a threat level of content located at a destination web site, in response to receiving from the client an identifier for accessing content at the destination web site, and a second warning generator, sending to the client a warning including an instruction to perform a confirmatory touch gesture to confirm a request to access the content, in response to receiving from the client a request to access the content.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

| Table of elements in the figures | |
|---|---|
| Element | Description |
| 100 | client computing device |
| 110 | client processor |
| 120 | touch-enabled input/output module |
| 125 | touch-based keyboard |
| 130 | web browser |
| 140A | first warning generator |
| 140B | second warning generator (optional) |
| 140C | third warning generator |
| 200 | server computing device |
| 210 | server processor |
| 240A | first warning generator |
| 240B | second warning generator (optional) |
| 240C | third warning generator |
| 300 | virus scan engine(s) |
| 350 | search engine(s) |
| 410-460 | display screens |

Elements numbered in the 1000's are operations of flow charts.

DETAILED DESCRIPTION

In accordance with embodiments of the present invention, modules, systems and methods are provided for warning a user about specific malware that he is encountering, and requiring a confirmatory action from the user that is different than a simple touch prior to accessing a suspicious web site, application or file. As described below, the present invention may be embodied inter alia with or without use of a server computer.

Client-Based Embodiment

Figure 1:
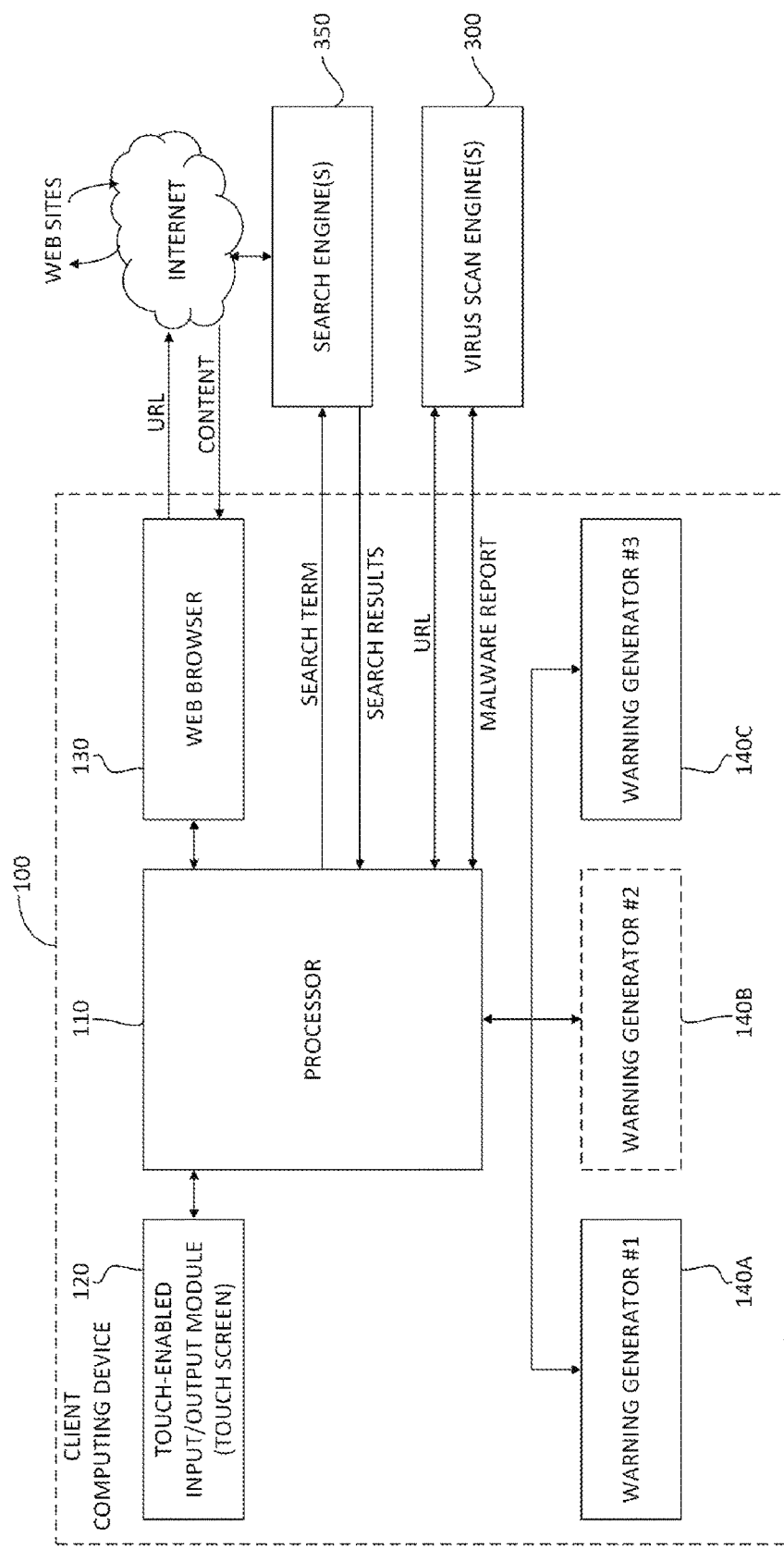
FIG. 1 is a simplified diagram of a client-based embodiment of a malware warning module for URLs, in accordance with an embodiment of the present invention.

Reference is made to FIG. 1, which is a simplified diagram of a client-based embodiment of a malware warning module for URLs, in accordance with an embodiment of the present invention. Shown in FIG. 1 is a client device 100 with a processor 110, a touch-enabled input/output (I/O) module 120, such as a touch screen, and a web browser 130. Client 100 also includes a data bus and memory modules that store data and instructions; the memory modules being accessible by processor 110 via the data bus, for processor 110 to perform read and write operations.

In accordance with an embodiment of the present invention, client device 100 is an electronic computing device, including inter alia mobile devices such as smartphones, tablets, and laptops that have processors, memory and communication interfaces. Client device 100 may be programmed and configured to perform the methods of the present invention described below with reference to FIGS. 2-22. Depending on the operating system of client device 100, standard appropriate programming languages for developing and testing applications, including application program interfaces (APIs), pop-up windows and animations, can implement the methods of the present invention.

I/O module 120 provides for touch and gesture input to processor 110 in response to a user touching a surface of the device with an object such as a finger, or sliding his finger along the surface of the device to perform a gesture such as the familiar "swipe" gesture. Web browser 130 may be, for example, the familiar ANDROID®-based or SAFARI® web browsers.

Shown in FIG. 1 are three warning generators, 140A, 140B and 140C. Operation of these warning generators is described below with reference to FIGS. 2-14. Warning generators 140A, 140B and 140C may be three separate modules, as shown in FIG. 1, they may be combined into fewer modules, or they may be separated into more modules. Warning generators 140A, 140B and 140C may be software, firmware or hardware modules, or a combination of software, firmware and hardware modules.

Also shown in FIG. 1 are one or more virus scan engines 300, and one or more search engines 350. Scan engine(s) 300 scan content at a designated URL address for malicious or potentially malicious malware code. Scan engine(s) 300 may be a physical gateway capable of scanning content at a URL address, and/or may be a cloud-based content scanning service. Search engine(s) 350 may be a physical or cloud-based search service, such as Microsoft BING®.

Figure 2:
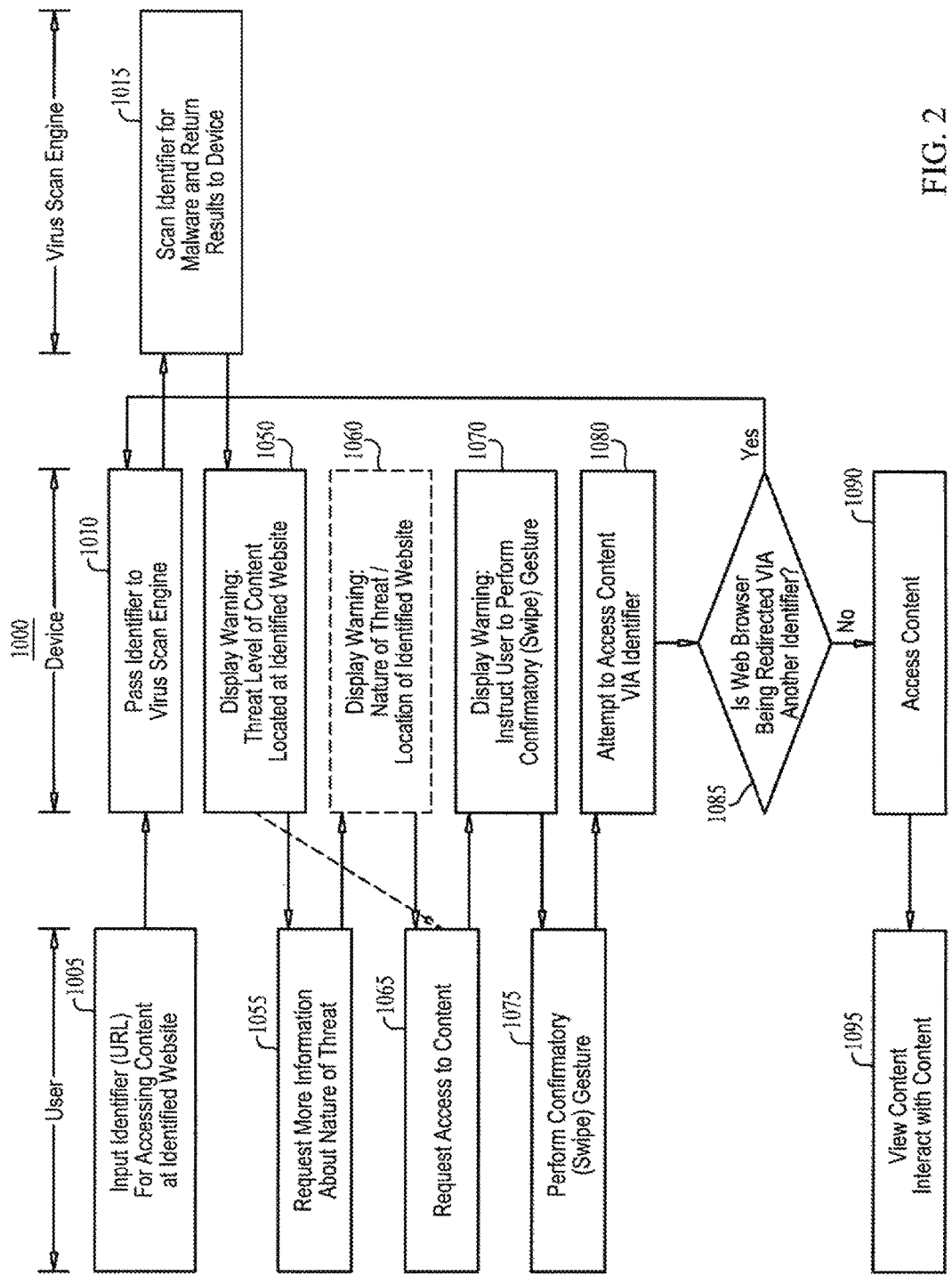
FIG. 2 is a simplified flowchart of a client-based method for malware warning for URLs, in accordance with an embodiment of the present invention.
Figure 4:
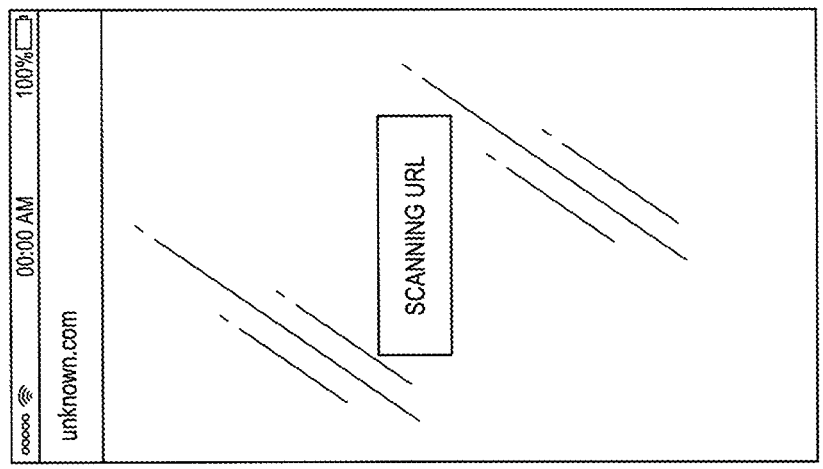
FIG. 4 is a screen shot showing that the user has input a specific identifier, in accordance with an embodiment of the present invention.
Figure 3:
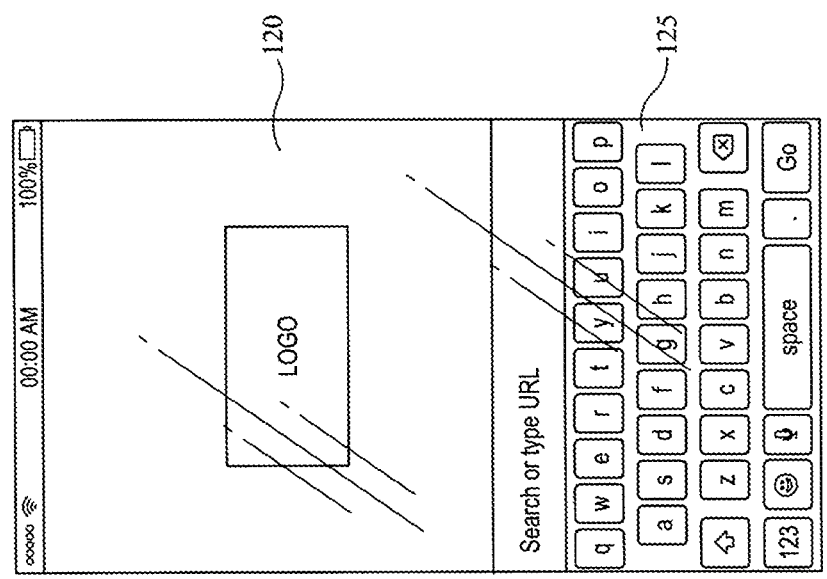
FIG. 3 is a screen shot of a simple interface display via which a user is prompted to enter a URL using a touch-based keyboard, in accordance with an embodiment of the present invention.

Reference is made to FIG. 2, which is a simplified flowchart 1000 of a client-based method for malware warning for URLs, in accordance with an embodiment of the present invention. Flowchart 1000 of FIG. 2 is divided into three columns. The left column includes operations performed by a user of device 100, the middle column includes operations performed by device 100, and the right column includes operations performed by scan engine(s) 300.

At the beginning of method 1000, the user is prompted to enter an identifier, such as a URL, for accessing web content. In this regard, reference is made to FIG. 3, which is a screen shot of a simple interface display via which a user is prompted to enter a URL using a touch-based keyboard 125 displayed in I/O module 120, in accordance with an embodiment of the present invention. At operation 1005, the user enters an identifier for accessing content at a web site that is identified by the identifier. In this regard, reference is made to FIG. 4, which is a screen shot showing that the user has entered a specific identifier, namely, "unknown.com", in accordance with an embodiment of the present invention.

At operation 1010, device 100 passes the URL to scan engine(s) 300 for analysis. Alternatively, instead of invoking scan engine(s) 300, device 100 may consult a database that stores malware information for each of a plurality of URLs. If the specific URL input by the user does not reside in the database, or if it does reside in the database but its information is out of date, only then does device 100 pass the URL to scan engine(s) 300 to perform a scan of the URL. Operation 1010 may be performed inter alia by invoking remote or third-party scanners, such as the VirusTotal scanner at https://www.virustotal.com, using an API key. Virus-Total provides security results from many different scan engines. More time is required when the URL needs to be scanned, and device 100 may display a message to the user in response to which the user may either wait or cancel the scan. In this regard, reference is made to FIG. 5, which is a screen shot of a message, "This is taking longer than expected", displayed while device 100 is waiting for scan results, in accordance with an embodiment of the present invention.

At operation 1015, scan engines(s) 300 scan the content at the URL, generate a malware report for the content, and return the report to device 100.

At operation 1050, warning generator 140A generates a first warning including a threat level of the content located at the identified web site.

Figure 6:
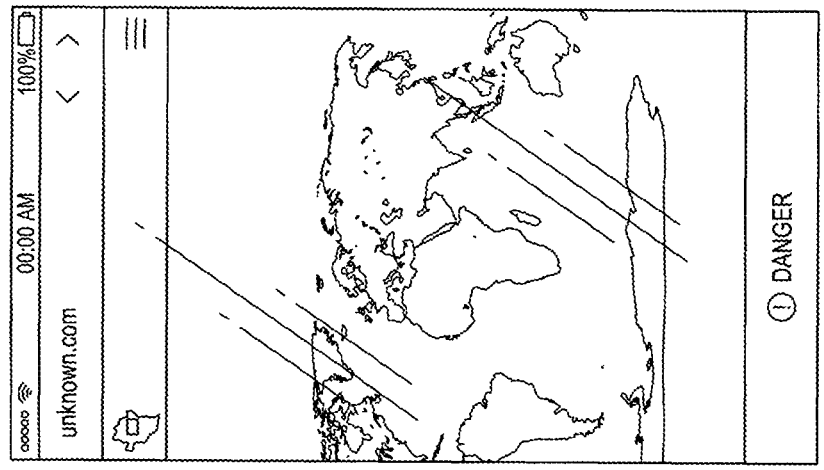
FIG. 6 is a screen shot of a threat level of "DANGER" for a web site, in accordance with an embodiment of the present invention.
Figure 5:
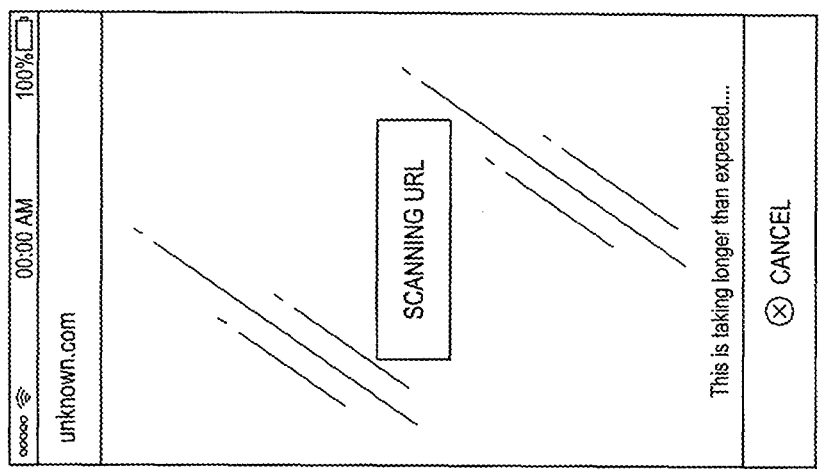
FIG. 5 is a screen shot showing a message, "This is taking longer than expected", displayed while a processor is waiting for scan results, in accordance with an embodiment of the present invention.

In accordance with one embodiment of the present invention, threat levels include "SAFE", "CAUTION" and "DANGER". Reference is made to FIG. 6, which is a screen shot of a threat level of "DANGER" for the web site "unknown.com", in accordance with an embodiment of the present invention.

Figure 7:
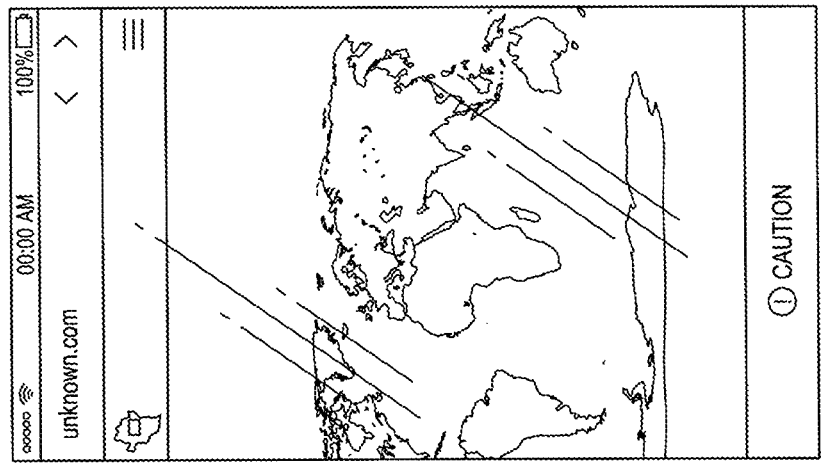
FIG. 7 is a screen shot of a second warning displayed, including the nature of a "DANGER" threat and a location of an identified web site, in accordance with an embodiment of the present invention.

At operation 1055 the user requests more information about the nature of the threat. At operation 1060 warning generator 140B generates a second warning including the nature of the threat and the location of the identified web site. In this regard, reference is made to FIG. 7, which is a screen shot of a warning displayed by warning generator 140B, including the nature of the "DANGER" threat and a location of the identified web site, in accordance with an embodiment of the present invention. Specifically FIG. 7 shows that the threat is phishing malware that steals personal information, and that the web site is categorized as "phishing", "malware" and "malicious", and resolves to a domain located in Russia.

Figure 8:
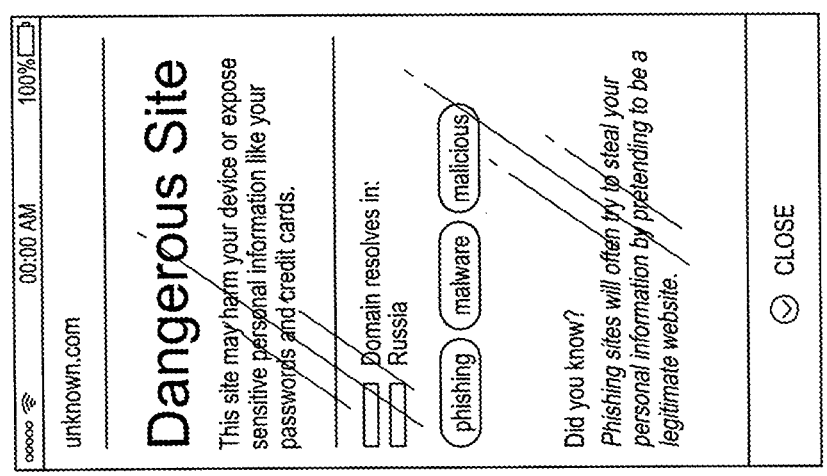
FIG. 8 is a screen shot of a threat level of "CAUTION" for a web site, in accordance with an embodiment of the present invention.
Figure 9:
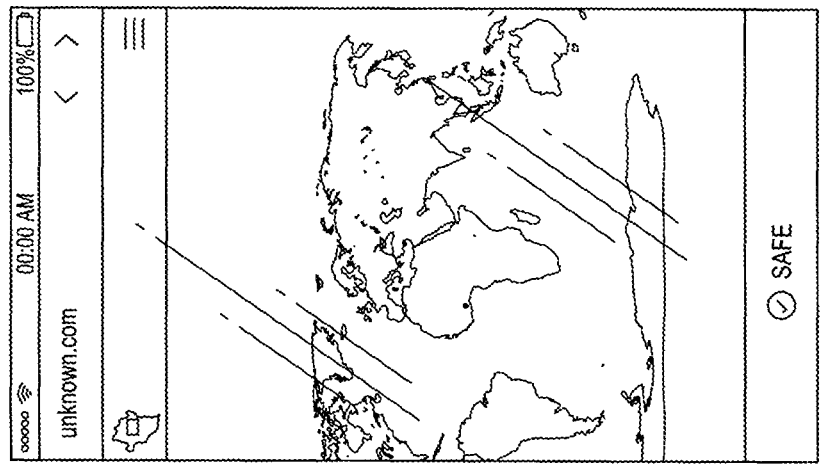
FIG. 9 is a screen shot of a second warning displayed, including the nature of a "CAUTION" threat and a location of the identified web site, in accordance with an embodiment of the present invention.

Reference is made to FIG. 8, which is a screen shot of a threat level of "CAUTION" for the web site "unknown.com", in accordance with an embodiment of the present invention. Reference is made to FIG. 9, which is a screen shot of a warning displayed by warning generator 140B, including the nature of the "CAUTION" threat and a location of the identified web site, in accordance with an embodiment of the present invention. FIG. 9 shows that the threat is phishing malware that steals personal information, and that the web site is categorized as "news & media" and resolves to a domain located in the United States.

Figure 10:
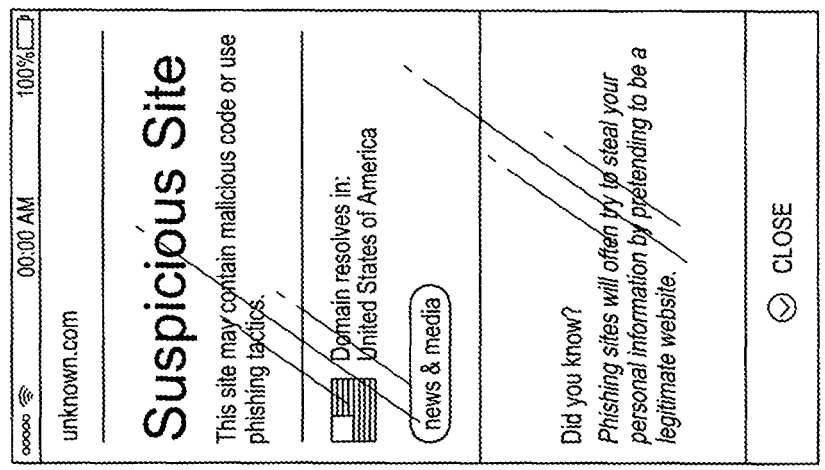
FIG. 10 is a screen shot of a threat level of "SAFE" for a web site, in accordance with an embodiment of the present invention.
Figure 11:
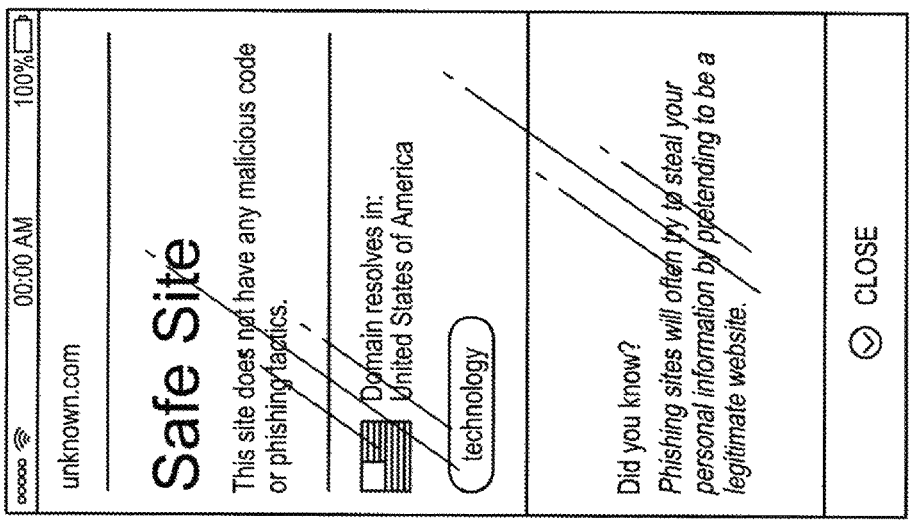
FIG. 11 is a message indicating that a "SAFE" web site does not have any malicious code or phishing tactics, in accordance with an embodiment of the present invention.
Figure 13:
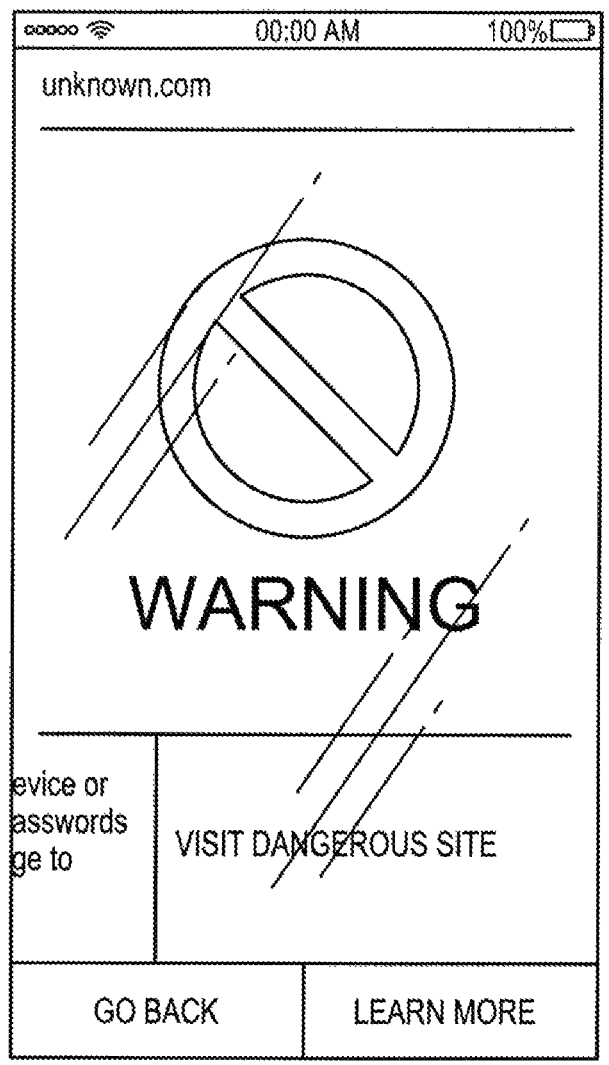
FIG. 13 is a screen shot of a swipe gesture being performed to access a suspicious web site, in accordance with an embodiment of the present invention.

Reference is made to FIG. 10, which is a screen shot of a threat level of "SAFE" for the web site "unknown.com", in accordance with an embodiment of the present invention. Reference is made to FIG. 11, which is a screen shot of a message displayed by warning generator 140B indicating that the "SAFE" web site does not have any malicious code or phishing tactics, in accordance with an embodiment of the present invention. FIG. 11 shows that the web site is categorized as "technology" and resolves to a domain located in the United States.

At operation 1065 the user requests access to the content at the identified web site. At operation 1070, warning generator 140C prompts the user to perform a confirmatory gesture, such as a swipe gesture. Such a prompt is shown in FIG. 12.

Figure 12:
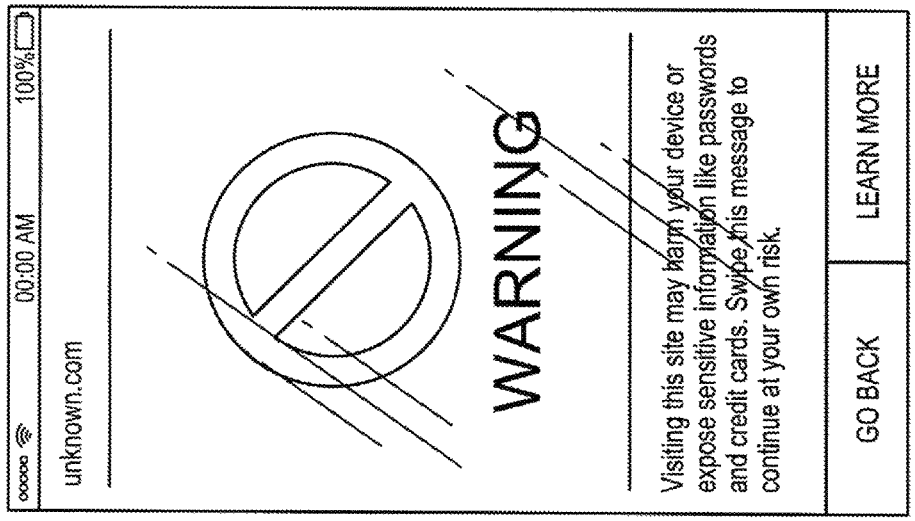
FIG. 12 is a screen shot showing a threat warning for a web site displayed by a processor, requiring a user to perform a swipe gesture in order to access a suspicious web site, in accordance with an embodiment of the present invention.

Reference is made to FIG. 12, which is a screen shot showing a threat warning for a web site displayed by warning generator 140C, requiring a user to perform a swipe gesture in order to access a suspicious web site, in accordance with an embodiment of the present invention. FIG. 12 shows a threat warning for the web site "unknown.com" displayed by warning generator 140C, in accordance with an embodiment of the present invention. The warning includes the text "WARNING" displayed with a caution sign, and a warning message indicating that accessing the identified web site may be harmful to device 100 or may compromise sensitive information of the user. The warning also provides touch controls for the user to "GO BACK" and not access the identified web site, or to "LEARN MORE" about the nature of the threat. If the user wishes nevertheless to access the identified web site, then the use is required to perform a swipe gesture on I/O module 120, to slide the warning message off of the display.

At operation 1075 the user reviews the message and decides nevertheless to perform the confirmatory gesture. In this regard, reference is made to FIG. 13, which is a screen shot of a swipe gesture being performed on I/O module 120 to access the identified web site, in accordance with an embodiment of the present invention. As the swipe gesture is being performed and the warning message slides out of the display, another message, "VISIT DANGEROUS SITE", slides into the display. As such, it will be appreciated by those skilled in the art that it is highly unlikely that the user access the identified web site unintentionally.

At operation 1080, in response to the user having performed the confirmatory gesture at operation 1075, web browser 130 attempts to access the identified web site. However, it may be that the identified web site redirects web browser 130 using a different identifier than that received at operation 1005. Device 100 may register itself to listen to redirection events for web browser 130 and, as such, is able to hook web browser 130 before it accesses the different identifier. At decision 1085, device 100 decides whether or not web browser 130 has been redirected. If so, processing returns to operation 1010, where device 100 passes the different identifier to scan engine(s) 300 for analysis. Otherwise, if decision 1085 decides that web browser 130 has not been redirected, processing advances to operation 1090, where web browser 130 accesses the content that the user requested at operation 1065. The user then views and interacts with the content at operation 1095, thereby completing flowchart 1000.

In an alternative embodiment of the present invention, warning generator 140B of FIG. 1 may be eliminated and, correspondingly, method 1000 of FIG. 2 may advance directly from operation 1050 to operation 1065. As such, the tri-warning module, system and method of FIGS. 1 and 2 may optionally be a bi-warning module, system and method, respectively, without using the intermediate informational warnings, such as the warnings shown in FIGS. 7, 9 and 11. Instead, after displaying the threat level of an identified web site, the user is required to perform a confirmatory gesture in order to access the site. To indicate this alternative embodiment, warning generator 140B is drawn with a dashed rectangle in FIG. 1, operation 1060 is drawn with a dashed rectangle in FIG. 2, and an arrow from operation 1050 to operation 1065 is drawn with a dashed line in FIG. 2.

Classification of malware threats by warning generator 140A into types "DANGER", "CAUTION" and "SAFE" may be based on statistics of the virus scan results provided to warning generator 140A from virus scan engine(s) 300. In one exemplary embodiment, categorization may be based on statistical conditions such as those shown in TABLE I below.

TABLE I

Statistical breakdown of scan engine results into threat types

| Threat Type | Condition |
| --- | --- |
| DANGER | >75% of the scan engines indicate threat |
| CAUTION | 5%-75% of the scan engines indicate threat |
| SAFE | <5% of the scan engines indicate threat |

Figure 14:
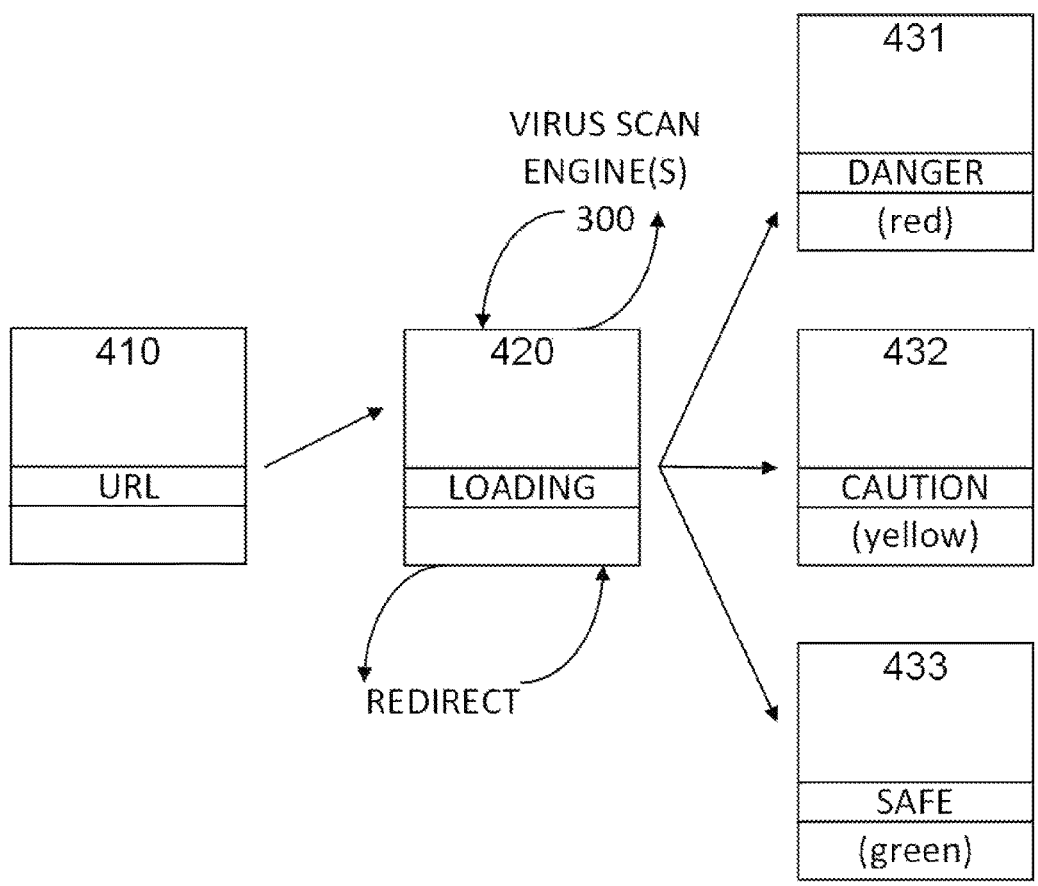
FIG. 14 is a simplified flow diagram using display screens to illustrate stages of a client-based malware warning mechanism, in accordance with an embodiment of the present invention.

Reference is made to FIG. 14, which is a simplified flow diagram using display screens to illustrate stages of a client-based malware warning mechanism, in accordance with an embodiment of the present invention. FIG. 14 includes virus scan engine(s) 300. Screen 410 is a landing screen, e.g., the screen shown in FIG. 3, prompting a user to enter a URL. Screen 420 is a loading screen, e.g., the screen shown in FIG. 4. While screen 420 is being displayed, warning generator 140A determines the security threat of the URL that was entered in screen 410. If this security information is not readily available, then warning generator 140A queries virus scan engine(s) 300 for the information about the URL. After determining the security threat, warning generator 140A displays either a "DANGER" screen 431, e.g., the screen shown in FIG. 6, or a "CAUTION" screen 432, e.g., the screen shown in FIG. 8, or a "SAFE" screen 433, e.g., the screen shown in FIG. 10.

Device 100 then performs the warning method of FIG. 2 beginning at operation 1025. Upon request by the user of information about the nature of the threat, warning generator 140B generates warning screens, such as the screens shown in FIGS. 7, 9 and 11, with warning information for the respective "DANGER", "CAUTION" and "SAFE" threat levels.

If the user decides to access the content at the URL, then warning generator 140C requires that the user perform a confirmatory gesture. Upon performing the confirmatory gesture, web browser 130 attempts to access the URL. If web browser is re-directed to another URL, then device 100 hooks the re-direction event and displays screen 420, prior to web browser 130 accessing the other URL.

Server-Based Embodiment

In the embodiment of the FIG. 1, I/O module 120, web browser 130 and the warning generators are components of the same device, namely, client device 100. In another embodiment of the present invention, module 120 and web browser 130 are components of one device, namely, client device 100, and the warning generators are components of another device, namely, a server computing device 200.

Figure 15:
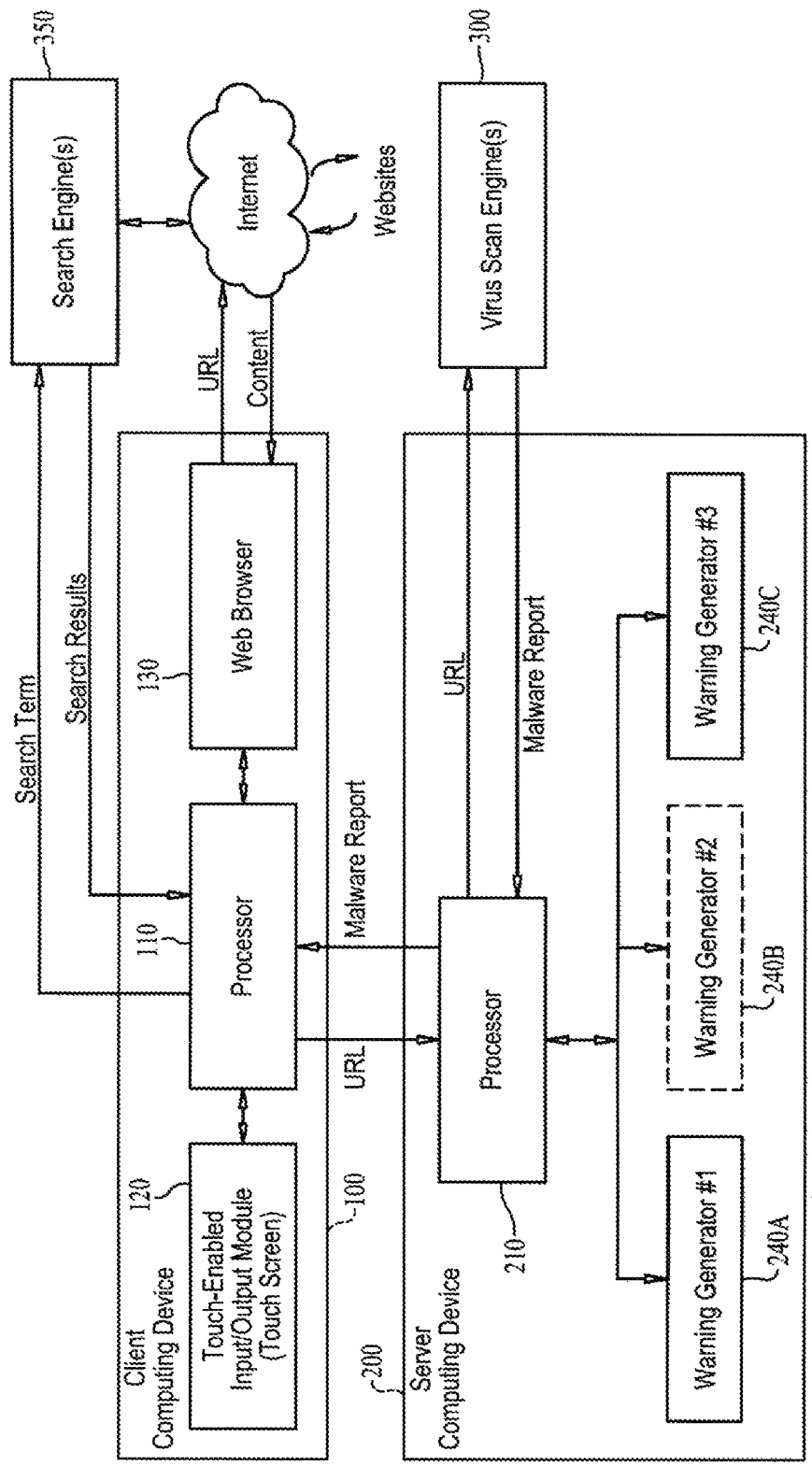
FIG. 15 is a simplified diagram of a server-based embodiment of a malware warning system for URLs, in accordance with an embodiment of the present invention.

Reference is made to FIG. 15, which is a simplified diagram of a server-based embodiment of a malware warning system for URLs, in accordance with an embodiment of the present invention. As shown in FIG. 15 server 200 includes three warning generators, 240A, 240B and 240C. Warning generators 240A, 240B and 240C may be three separate modules, as shown in FIG. 15, they may be combined into fewer modules, or they may be separated into more modules.

It will be appreciated by those skilled in the art that a client-server architecture affords many variations in distribution of processing labor between the client and the server, all of which are contemplated by the present invention. Thus, referring to FIG. 15, server 200, instead of device 100, may pass the search terms to search engine(s) 350 and receive the results therefrom.

Figure 16:
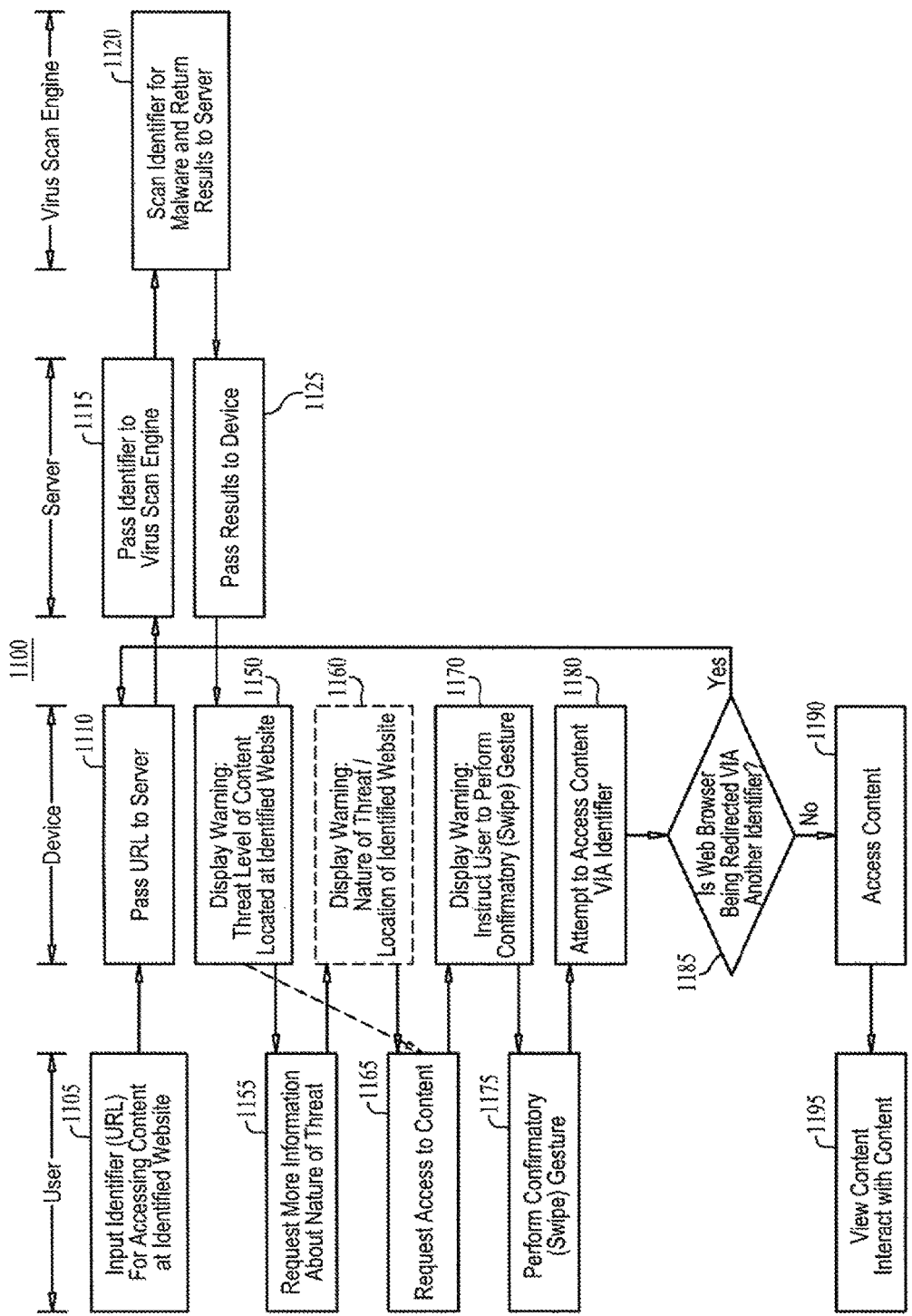
FIG. 16 is a simplified flowchart of a server-based method for malware warning for URLs, in accordance with an embodiment of the present invention.

Similarly, referring to FIG. 15, the three warning generators may instead be components of device 100, as in FIG. 1, and server 200 may be operative only to receive a URL and return a malware report, as in FIG. 16. Operation of such an embodiment is illustrated in FIG. 16.

Reference is made to FIG. 16, which is a simplified flowchart 1100 of a server-based method for malware warning for URLs, in accordance with an embodiment of the present invention. Flowchart 1100 of FIG. 16 is divided into four columns. The left-most column includes operations performed by a user of device 100, the second-from-leftmost column includes operations performed by device 100, the second-from rightmost column indicates operations performed by server 200, and the right column includes operations performed by scan engine(s) 300.

At operation 1105, the user enters an identifier, such as a URL, for accessing content at a web site identified by the identifier. At operation 1110, device 100 passes the identifier to server 200 for analysis, thereby relieving device 100 from this task. At operation 1115, server 200 passes the identifier to scan engine(s) 300 for analysis. Alternatively, instead of invoking scan engine(s) 300, server 200 may consult a database that stores malware information for each of a plurality of URLs. If the specific URL input by the user does not reside in the database, or if it does reside in the database but its information is out of date, only then does server 200 pass the URL to scan engine(s) 300 to perform a scan of the URL.

At operation 1120, scan engine(s) scan the identified content for potential malware, and return a malware report to server 200. At operation 1125, server 200 passes the scan results to device 100.

Subsequent operations 1150-1195 are similar to correspondingly numbered operations 1050-1095, which were described above with reference to FIG. 2.

Figure 17:
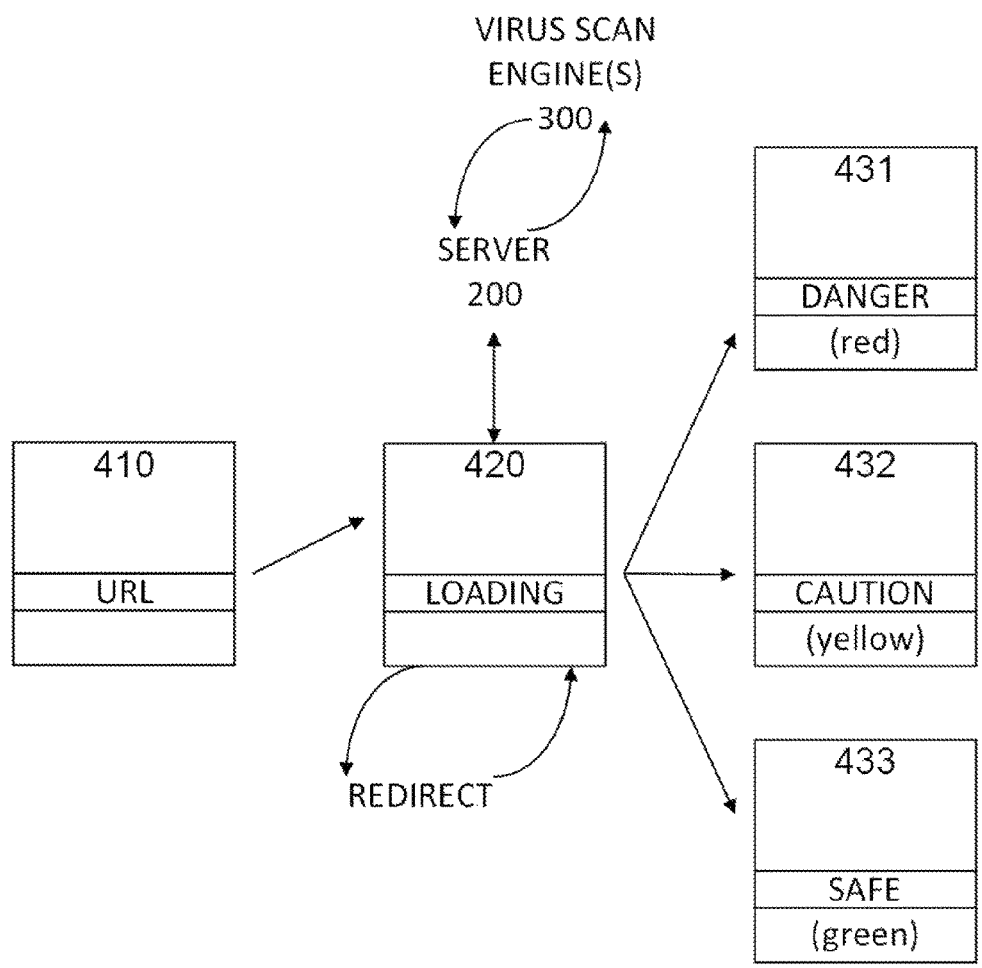
FIG. 17 is a simplified flow diagram using display screens to illustrate stages of a server-based malware warning mechanism, in accordance with an embodiment of the present invention.

Reference is made to FIG. 17, which is a simplified flow diagram using display screens to illustrate stages of a server-based malware warning mechanism, in accordance with an embodiment of the present invention. FIG. 17 includes server 200 and virus scan engine(s) 300. Screen 410 is a landing screen, e.g., the screen shown in FIG. 3, prompting a user to enter a URL. Screen 420 is a loading screen, e.g., the screen shown in FIG. 4. While screen 420 is being displayed, device 100 sends the URL that was entered in screen 410 to server 200 for analysis. If security information for the URL is not readily available to server 200, then server 200 queries virus scan engine(s) 300 for the information about the URL. After receiving a malware report for the URL from server 200, warning generator 140A sends a malware report to device 100, and device 100 displays either a "DANGER" screen 431, e.g., the screen shown in FIG. 6, or a "CAUTION" screen 432, e.g., the screen shown in FIG. 8, or a "SAFE" screen 433, e.g., the screen shown in FIG. 10.

Device 100 then performs the warning method of FIG. 16 beginning at operation 1115. Upon request by the user of information about the nature of the threat, warning generator 140B generates warning information, such as the information shown in FIGS. 7, 9 and 11 for the respective "DANGER", "CAUTION" and "SAFE" threat levels.

If the user decides to access the content at the URL, then warning generator 140C requires that the user perform a confirmatory gesture. Upon performing the confirmatory gesture, web browser 130 attempts to access the URL. If web browser 130 is re-directed to another URL, then device 100 hooks the re-direction event, reports the re-direction event to server 200, which then invokes scan engine(s) 300 to analyze the other URL.

Malware Warnings for Search Results

It will be appreciated by those skilled in the art that the warning modules, systems and methods of the present invention are of widespread advantage to many client-server applications. In some embodiments, the present invention is applied to search engines, to provide warning modules, systems and methods for potential malware in web search results. These applications may be embodied inter alia with or without use of a server computer.

Figure 18:
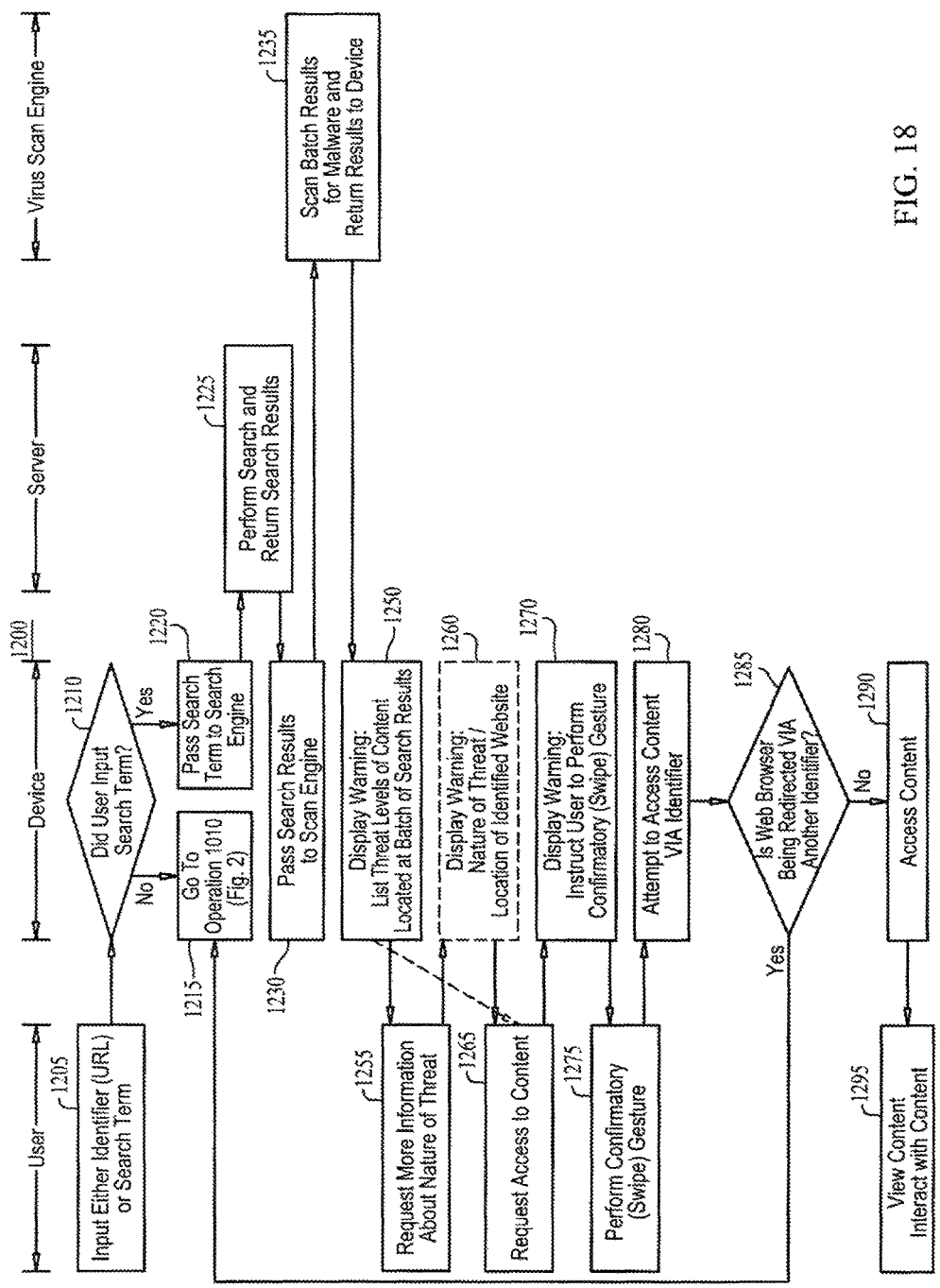
FIG. 18 is a simplified flowchart of a client-based method for malware warning for search results, in accordance with an embodiment of the present invention.

Reference is made to FIG. 18, which is a simplified flowchart 1200 of a client-based method for malware warning for search results, in accordance with an embodiment of the present invention. Flowchart 1200 of FIG. 18 is divided into four columns. The left-most column includes operations performed by a user, the second-from-leftmost column includes operations performed by device 100, the second-from rightmost column indicates operations performed by search engine(s) 350, and the right column includes operations performed by scan engine(s) 300.

At operation 1205, the user enters either an identifier, such as a URL, or a search term. At decision 1210, device 100 decides whether or not the user entered a search term. For example, device 100 may examine the text string input by the user for the presence of a domain name extension such as ".com". If decision 1210 determines that the user did not enter a search term, then the user input is an identifier, and at operation 1215 flowchart 1200 advances to operation 1010 of FIG. 2; namely, a method for malware warning for identifiers.

If decision 1210 determines that the user entered a search term, then at operation 1220 device 100 passes the search term to search engine(s) 350. At operation 1225 search engine(s) 350 perform their search and return their search results to device 100. At operation 1230 device 100 in turn passes a batch of the search results to scan engine(s) 300, for inspection of each result for potential malware. Search results are sent to scan engine(s) 300 in batches, since there may be a large number of results, and it is not necessary for device 100 to wait for scan engine(s) 300 to scan all of the results. Each batch may be inter alia a display page worth of results. At operation 1235 scan engine(s) 300 analyze the batch of search results and returns their malware reports to device 100.

Figure 20:
FIG. 20 is a screen shot of a safe assessment of search results in accordance with an embodiment of the present invention.
Figure 19:
FIG. 19 is a screen shot of a warning regarding potential risks of search results in accordance with an embodiment of the present invention.

At operation 1250, warning generator 140A displays a list of the search results in the batch together with the threat levels of content located at each result. Reference is made to FIG. 19, which is a screen shot of a warning regarding potential risks of search results in accordance with an embodiment of the present invention. Reference is made to FIG. 20, which is a screen shot of a safe assessment of search results in accordance with an embodiment of the present invention.

At operation 1255, the user requests more information about the nature of the threat for one or more of the search results in the list; e.g., the result marked "CAUTION" in FIG. 19. At operation 1260, warning generator 140B displays information about the nature of the threat and/or the location of the one or more search results.

At operation 1265, after having seen the information displayed by warning generator 140B, the user requests access to one of the search results. At operation 1270, warning generator 140C displays a warning instructing the user to perform a confirmatory gesture, such as a swipe gesture, to confirm his request. At operation 1275, the user performs the confirmatory gesture.

At operation 1280, in response to the user having performed the confirmatory gesture at operation 1275, web browser 130 attempts to access the requested search result. However, it may be that the requested search result redirects web browser 130 to a different web site. Device 100 may register itself to listen to redirection events for web browser 130 and, as such, is able to hook web browser 130 before it accesses the different web site. At decision 1285, device 100 decides whether or not web browser 130 has been redirected. If so, processing returns to operation 1010 of FIG. 2, where device 100 passes an identifier for the redirected web site to scan engine(s) 300 for analysis. Otherwise, if decision 1285 decides that web browser 130 has not been redirected, processing advances to operation 1290, where web browser 130 accesses the content that the user requested at operation 1265. The user then views and interacts with the content at operation 1295, thereby completing flowchart 1200.

Figure 21:
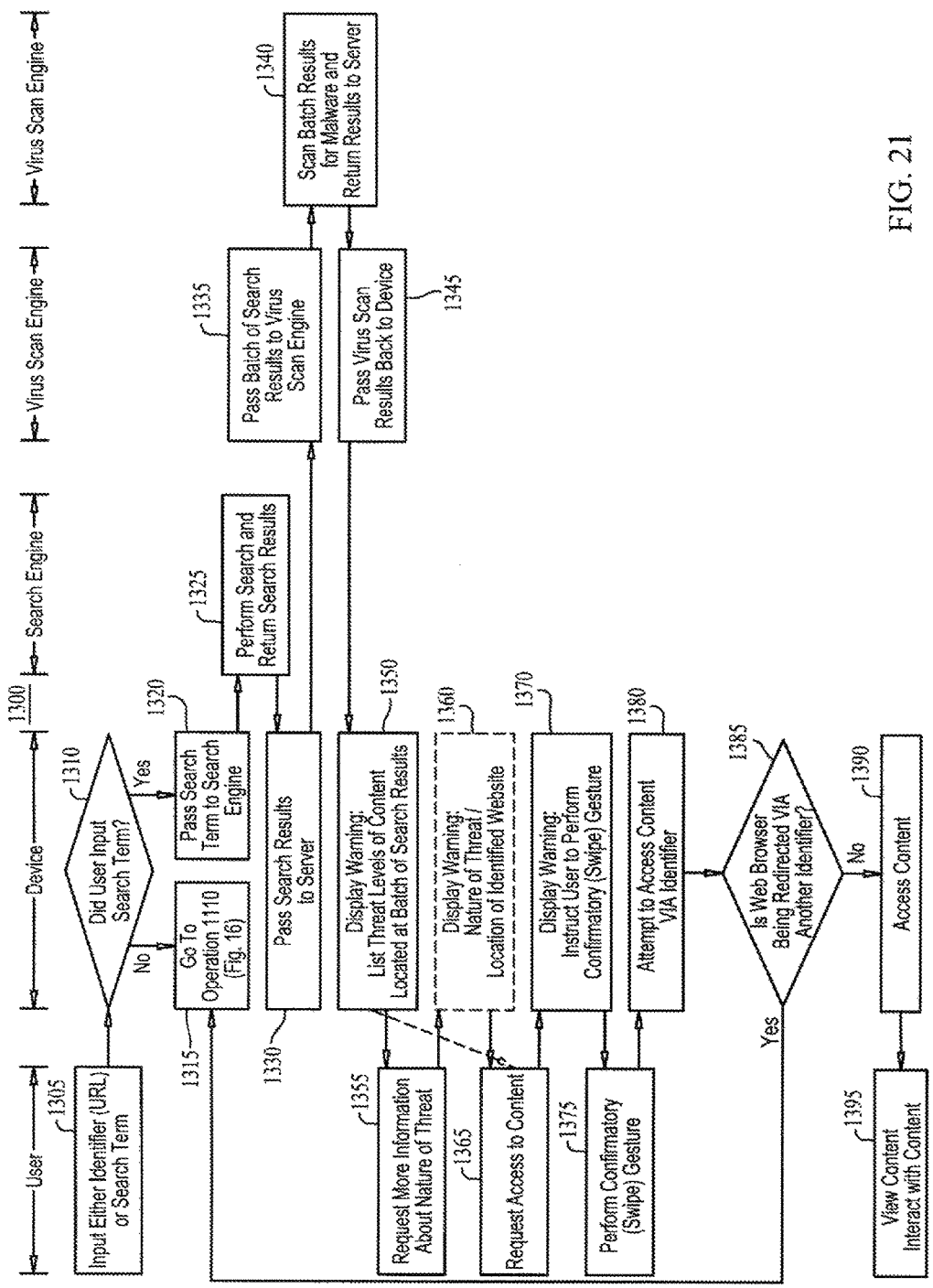
FIG. 21 is a simplified flowchart of a server-based method for malware warning for search results, in accordance with an embodiment of the present invention.

Reference is made to FIG. 21, which is a simplified flowchart 1300 of a server-based method for malware warning for search results, in accordance with an embodiment of the present invention. The flowchart of FIG. 21 is divided into five columns. The leftmost column indicates operations performed by a user, the second-from-leftmost column indicates operations performed by device 100, the middle column indicates operations performed by search engine(s) 350, the second-from-rightmost column indicates operations performed by server 200, and the rightmost column indicates operation performed by scan engine(s) 300.

At operation 1305 the user enters either an identifier for web site content, or a search term. At decision 1310 device 100 decides whether or not the user entered a search term. Decision 1310 may be performed as described above with reference to decision 1210 of FIG. 18. If decision 1310 decides that the user did not enter a search term, then at operation 1315 flowchart 1300 advances to operation 1110 of FIG. 16; namely, a method for malware warning for identifiers.

Otherwise, if decision 1310 decides that the user did enter a search term, then at operation 1320 device 100 passes the search term to search engine(s) 350. At operation 1325 search engine(s) 350 perform their search and return their search results to device 100. At operation 1330 device 100 receives the search results, but prior to displaying them to the user, device 100 passes a batch of the search results to server 200 for a malware check.

At operation 1335 server 200 passes a batch of search results to scan engine(s) 300 for scanning. At operation 1340, scan engine(s) 300 scan the batch of search results, and return malware reports to server 200. At operation 1345 server 200 passes the reports back to device 100.

Subsequent operations 1350-1395 are similar to correspondingly numbered operations 1250-1295 of FIG. 18.

As described above, in an alternative embodiment of the present invention, server 200, instead of device 100, passes the search terms to search engine(s) 350. In this case, instead of operation 1330, device 100 passing the search results to server 200 subsequent to operation 1325, device 100 instead passes the search terms to server 200 prior to operation 1325.

Figure 22:
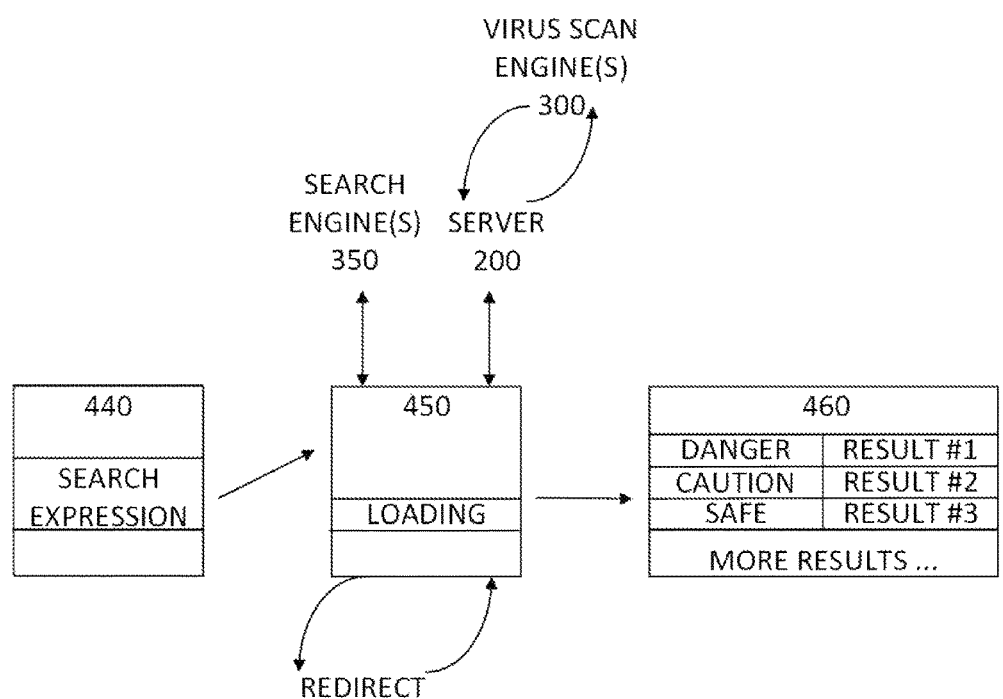
FIG. 22 is a simplified flow diagram using display screens to illustrate stages of a server-based malware warning mechanism for web search results, in accordance with an embodiment of the present invention.

Reference is made to FIG. 22, which is a simplified flow diagram using display screens to illustrate stages of a server-based malware warning mechanism for web search results, in accordance with an embodiment of the present invention. FIG. 22 includes server 200, virus scan engine(s) 300 and search engine(s) 350. Screen 440 is a landing screen, prompting a user to enter a search expression. Screen 450 is a loading screen. While screen 450 is being displayed, device 100 sends the search expression that was entered in screen 440 to search engine(s) 350. After receiving a page of search results, device 100 sends the results to server 200, which sends the URLs of the search results to virus scan engine(s) 300 for analysis. Server 200 returns the malware reports to client 100, and warning generator 140A displays a list of results together with their levels of threat, as shown in screen 460.

If the user touches one of the results to request information about the nature of the threat, then processor 210 performs the warning method of FIG. 2 beginning at operation 1015, and warning generator 140B generates warning information, such as the information shown in threat levels.

Thus is will be appreciated by those skilled in the art that the present invention prevents a "one touch too late" catastrophe and ensures that a user does not access suspect malware unintentionally, by provide multiple warnings about specific malware that a user is encountering, and by requiring a confirmatory action from the user that is different than a simple touch, prior to accessing a suspicious web site, application or file.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A non-transitory computer readable medium storing instructions, which, when executed by a processor of an electronic device, cause the processor to:

register to listen to redirection events for a web browser that receives identifiers for accessing content at a destination web site;

generate three different successive warning displays to prevent access to malicious content, comprising:

receive an identifier for accessing content at a destination web site;

in response to receiving the identifier, send the identifier to a plurality of virus scan engines;

generate a first warning display comprising a threat level of content located at the destination web site, wherein the threat level is determined by a percentage of the virus scan engines that indicate that the destination web site is a threat;

receive a request for more information about the nature of the threat;

in response to receiving the request for more information, generate a second warning display comprising information about both (i) the nature of the threat of the content, and (ii) a location of the destination web site;

receive a request to access the content;

in response to receiving the request to access the content, generate a third warning display comprising an instruction to perform a confirmatory touch gesture to confirm the request to access the content;

in response to detecting the confirmatory touch gesture, attempt to access the content at the destination web site;

recognize an event that the identifier is being re-directed by the destination web site to another identifier; and prior to accessing the content using the other identifier, repeating said generate a first warning display, receive a request for more information, generating a second warning display, receive a request to access the content, and generate a third warning display, using the other identifier.

2. The computer readable medium of claim 1 wherein the identifier is a URL.

3. The computer readable medium of claim 1 wherein the confirmatory touch gesture is a swipe gesture.

4. A malware warning module for an electronic device, comprising:
 a touch-enabled input module, (i) receiving touch-based user input to a web browser comprising identifiers to access content at a destination web site, (ii) registering to listen to redirection events for the web browser that receives the identifiers, and (iii) generating three different successive warning displays to prevent access to malicious content;
 a first warning display generator, sending an identifier of a destination web site to a plurality of virus scan engines in response to said one or more input devices receiving the identifier for accessing content at the destination web site, and generating a first warning display comprising a threat level of content located at a destination web site, wherein the threat level is determined by a percentage of the virus scan engines that indicate that the destination web site is a threat;
 a second warning display generator, generating a second warning display comprising information about both (i) the nature of the threat of the content, and (ii) a location of the destination web site, in response to the electronic device receiving a request for more information about the nature of the threat; and
 a third warning display generator, generating a third warning display comprising an instruction to perform a confirmatory touch gesture to confirm a request to access the content, in response to the electronic device receiving a request to access the content; and
 a content accessor, attempting to access the content in response to detecting the confirmatory touch gesture, recognizing an event that the identifier is being re-directed by the destination web site to another identifier, and re-invoking said first, second and third warning display generators with the other identifier, prior to accessing the content using the other identifier.

5. The module of claim 4 wherein the identifier is a URL.

6. The module of claim 4 wherein the confirmatory touch gesture is a swipe gesture.

7. A malware warning system, comprising:
 a touch-enabled client computing device (i) sending requests to a web browser for accessing content at a destination web site, (ii) receiving replies from a server computing device, and (iii) registering to listen to redirection events for the web browser; and
 a server computing device (i) receiving the requests from the client for accessing content at the destination web site, (ii) receiving from the client redirection events for the web browser, and (iii) generating three different warning displays to prevent access to malicious content, comprising:
  a first warning display generator, sending an identifier of a destination web site to a plurality of virus scan engines in response to receiving from the client the identifier from the client to access content at the destination web site, and sending to the client a first warning display comprising a threat level of content located at a destination web site, wherein the threat level is determined by a percentage of the virus scan engines that indicate that the destination web site is a threat;
  a second warning display generator, sending to the client a second warning display comprising information about both (i) the nature of the threat of the content, and (ii) a location of the destination web site, in response to receiving from the client a request for more information about the nature of the threat;
  a third warning display generator, sending to the client a third warning display comprising an instruction to perform a confirmatory touch gesture to confirm a request to access the content, in response to receiving from the client a request to access the content; and
  a content accessor, attempting to access the content in response to detecting that the confirmatory touch gesture has been performed on said client, recognizing an event that the identifier is being re-directed by the destination web site to another identifier, and re-invoking said first, second and third warning generators with the other identifier, prior to accessing the content using the other identifier.

8. The system of claim 7 wherein the identifier is a URL.

9. The system of claim 7 wherein the confirmatory touch gesture is a swipe gesture.

10. A non-transitory computer readable medium storing instructions, which, when executed by a processor of an electronic device; cause the processor to:
 register to listen to redirection events for a web browser that receives identifiers for accessing content at a destination web site;
 receive, by the web browser, an identifier for accessing content at a destination web site;
 in response to the browser receiving the identifier, send the identifier to a plurality of virus scan engines;
 generate a first warning display comprising a threat level of content located at the destination web site, wherein the threat level is determined by a percentage of the virus scan engines that indicate that the destination web site is a threat;
 receive a request to access the content;
 in response to receiving the request to access the content, generate a second warning display comprising an instruction to perform a confirmatory touch gesture to confirm the request to access the content;
 in response to detecting the confirmatory touch gesture, attempt to access the content at the destination web site;
 recognize an event that the identifier is being re-directed by the destination web site to another identifies; and
 prior to accessing the content using the other identifier, repeat said generating a warning, and attempt to access the content, using the other identifier.

11. The computer readable medium of claim 10 wherein the identifier is a URL.

12. The computer readable medium of claim 10 wherein the confirmatory touch gesture is a swipe gesture.

13. A malware warning module for an electronic device, comprising:
 one or more touch-enabled input devices comprising web browsers, and (i) receiving touch-based identifiers for the web browsers to access content at a destination web site, and (ii) registering to listen to redirection events for the web browsers;
 a first warning display generator, sending an identifier of a destination web site to a plurality of virus scan engines in response to said one or more input devices receiving the identifier to accessing content at the destination web site, and generating a warning comprising a threat level of content located at the destination web site, wherein the threat level is determined by a percentage of the virus scan engines that indicate that the destination web site is a threat;

a second warning display generator, generating a warning comprising an instruction to perform a confirmatory touch gesture to confirm a request to access the content, in response to said one or more input devices receiving the request to access the content; and a content accessor, attempting to access the content in response to detecting the confirmatory touch gesture, recognizing an event that the identifier is being re-directed by the destination web site to another identifier, and re-invoking said first and second warning generators with the other identifier, prior to accessing the content using the other identifier.

14. The module of claim 13 wherein the identifier is a URL.

15. The module of claim 13 wherein the confirmatory touch gesture is a swipe gesture.

16. A malware warning system, comprising:

a touch-enabled client computer device sending requests comprising an identifier to a web browser for accessing content at a destination web site and receiving replies from a server computing device, and registering to listen to redirection events for the web browser; and a server computing device receiving the requests from the client computer device, comprising:

a first warning display generator, sending an identifier of a destination web she to a plurality of virus scan engines in response to receiving from the client a request for accessing content at a destination web site, and sending to the client a warning comprising a threat level of content located at the destination web site, wherein the threat level is determined by a percentage of the virus scan engines that indicate that the destination web site is a threat;

a second warning display generator, sending to the client a warning comprising an instruction to perform a confirmatory touch gesture to confirm a request to access the content, in response to receiving from the client the request to access the content; and a content accessor, attempting to access the content in response to detecting that the confirmatory touch gesture has been performed on said client, recognizing an event that the identifier is being re-directed by the destination web site to another identifier, and re-invoking said first and second warning generators with the other identifier, prior to accessing the content using the other identifier.

17. The system of claim 16 wherein the identifier is a URL.

18. The system of claim 16 wherein the confirmatory touch gesture is a swipe gesture.

* * * * *